United States Patent
Patterson

(10) Patent No.: US 8,072,092 B2
(45) Date of Patent: Dec. 6, 2011

(54) SYSTEM AND METHOD FOR SEQUENTIONAL ELECTRICAL POWER DELIVERY FROM TWO GENERATORS IN A VEHICLE ELECTRICAL SYSTEM

(75) Inventor: Ciaran Patterson, Chicago, IL (US)

(73) Assignee: C.E. Niehoff & Co., Evanston, IL (US)

( * ) Notice: Subject to any disclaimer, the term of this patent is extended or adjusted under 35 U.S.C. 154(b) by 47 days.

(21) Appl. No.: 12/658,942

(22) Filed: Feb. 16, 2010

(65) Prior Publication Data

US 2011/0018340 A1    Jan. 27, 2011

Related U.S. Application Data

(60) Provisional application No. 61/271,773, filed on Jul. 24, 2009.

(51) Int. Cl.
*B60L 1/00* (2006.01)
(52) U.S. Cl. .......................... 307/9.1; 307/23
(58) Field of Classification Search .................. 307/9.1, 307/10.1, 23; 320/126, 123, 138
See application file for complete search history.

(56) References Cited

U.S. PATENT DOCUMENTS

| | | | |
|---|---|---|---|
| 3,710,227 A | 1/1973 | Hill | |
| 3,809,995 A | 5/1974 | Hardin | |
| 3,863,127 A | 1/1975 | Raver | |
| 3,962,621 A | 6/1976 | Raver | |
| 4,336,485 A | 6/1982 | Stroud | |
| 4,347,473 A | 8/1982 | Stroud | |
| 4,509,005 A | 4/1985 | Stroud | |
| 4,686,442 A | 8/1987 | Radomski | |
| 4,757,249 A * | 7/1988 | Farber et al. | 320/126 |
| 4,829,228 A | 5/1989 | Buetemeister | |
| 4,967,137 A | 10/1990 | Canitrot et al. | |
| 5,162,720 A * | 11/1992 | Lambert | 320/104 |
| 5,254,936 A | 10/1993 | Leaf et al. | |
| 6,005,786 A | 12/1999 | Bluemel et al. | |
| 6,066,937 A | 5/2000 | Gutierrez et al. | |
| 6,111,768 A | 8/2000 | Curtiss | |
| 6,642,633 B1 | 11/2003 | Yang | |
| 7,335,998 B2 | 2/2008 | Wolf | |
| 7,545,121 B2 | 6/2009 | Bolduc | |
| 2006/0125443 A1 | 6/2006 | Bolduc | |
| 2007/0007818 A1 | 1/2007 | O'Gorman et al. | |
| 2010/0019722 A1 | 1/2010 | Sanchez | |

* cited by examiner

*Primary Examiner* — Jared Fureman
*Assistant Examiner* — Daniel Cavallari
(74) *Attorney, Agent, or Firm* — Law Offices of Michael M. Ahmadshahi

(57) ABSTRACT

A vehicle electrical system comprises two generators coupled with one or more electrical subsystem, each of which includes at least one of a stored energy source and electrical load. Each generator is regulated via its associated voltage regulator at a common regulation voltage. Sequential electrical power delivery from the generators is achieved via a sequencing means. Where two or more electrical subsystems are present, electrical isolation is achieved via an isolating means. Overcharge protection is achieved by sensing and responding to the highest voltage of the two or more electrical subsystems.

37 Claims, 9 Drawing Sheets

US 8,072,092 B2

SYSTEM AND METHOD FOR SEQUENTIONAL ELECTRICAL POWER DELIVERY FROM TWO GENERATORS IN A VEHICLE ELECTRICAL SYSTEM

CROSS REFERENCE TO RELATED APPLICATIONS

The present patent application is a formalization of a previously filed, co-pending provisional patent application entitled "System and Method for Sequential Electrical Power Delivery From Two Generators in a Vehicle Electrical System With Optional Electrical Subsystem Isolation and Overcharge Protection," filed Jul. 24, 2009, as U.S. patent application Ser. No. 61/271,773 by the inventor(s) named in this application. This patent application claims the benefit of the filing date of the cited provisional patent application according to the statutes and rules governing provisional patent applications, particularly 35 USC §119 and 37 CFR §1.78. The specification and drawings of the cited provisional patent application are specifically incorporated herein by reference.

REFERENCE TO COMPUTER PROGRAM LISTINGS SUBMITTED ON COMPACT DISK

This specification includes a compact disk appendix, which contains computer program code listings pursuant to 37 C.F.R. 1.52(e), and is hereby incorporated by reference. The computer codes are in ASCII format and are as follows:

| Creation Date | Creation Time | File Size (Kilobytes) | File Name |
| --- | --- | --- | --- |
| Jul. 15, 2005 | 1:54 PM | 44 | TEST 3.C |
| Jul. 13, 2005 | 7:39 AM | 14 | TEST.H |
| Jul. 26, 2004 | 1:53 PM | 2 | BATTERY.H |
| Aug. 6, 2002 | 12:27 AM | 1 | LINKER.RPM |
| Jun. 4, 2002 | 8:58 AM | 3 | SENSORS.H |
| May 7, 2002 | 9:53 AM | 2 | VECTORS.H |
| Oct. 30, 2001 | 7:39 AM | 5 | REGISTER.H |

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a system and method for providing electrical power sequentially from two generators to an electrical subsystem in an electrical system such as a vehicle electrical system. The system further may be configured to accommodate two or more electrical subsystems whereby such subsystems may be electrically isolated. Where two or more electrical subsystems are present in the electrical system, the system further maybe configured to protect against overcharging said subsystems.

BACKGROUND

The present invention relates to an electrical system, such as a vehicle electrical system, whereby two generators, whose output voltages are regulated via two corresponding voltage regulators, may sequentially deliver electrical power to one or more electrical subsystems. Each of the electrical subsystem may comprise at least one of an electrical load and a stored energy source such as a battery. In an electrical system where two or more electrical subsystems are present, the system further operates to isolate the two or more electrical subsystems while sequentially delivering electrical power to the electrical subsystems. In the latter configuration, the system may be further configured to protect against overcharging the two or more electrical subsystems. The following description in this section will focus on the third system configuration utilizing two electrical subsystems for describing the invention as it may readily be applied to the other two system configurations.

The vehicle electrical system comprises two electrical subsystems, each of which includes electrical loads and a battery. The system further comprises two generators and two associated voltage regulators which operate to provide electrical power to the two electrical subsystems sequentially at a first or common regulation voltage. A first generator is coupled with the two electrical subsystems via an isolating means whereby electrical power may flow from the generator to the two electrical subsystems but the electrical power may not flow from individual electrical subsystems to one another or the generator. This configuration is ordinarily utilized in vehicle electrical systems where one electrical subsystem comprises a starter and a first battery, dedicated for the vehicle startup, and the other electrical subsystem comprises the remaining electrical loads in the vehicle and a second battery. In applications where the two electrical subsystems require more electrical power than the first generator is capable of producing, a second generator provides electrical power, via a sequencing means, to meet the deficiency.

Isolation between the two electrical subsystems is desirable and/or required in order to insure that the vehicle's engine can be started even after one set of batteries is discharged or if there are other problems with one of the electrical subsystems. Other sophisticated electrical systems have been employed to insure that the electrical power delivery is managed as a function of the vehicle operating conditions. For instance, in a commonly assigned U.S. Pat. No. 7,202,574 entitled "System and Method for Electric Energy Switching and Control in a Vehicle," and its progenies, hereby incorporated by reference in their entireties, a control device determines the vehicle's operating conditions and facilitates the transfer of electrical energy between systems of electrical energy sources and their associated electrical loads based on the vehicle operating conditions. The device further determines the operating conditions of the systems of electrical energy sources and their associated electrical loads and facilitates the transfer of electrical energy between them in accordance with said operating conditions.

In addition to having isolated electrical subsystem in the vehicle electrical system, sequential electrical power delivery in the system is also advantageous for the following reasons. Electrical systems, such as those implemented in modern vehicles, include complex electronics and electrical equipment. Such electrical systems are normally comprised of an internal combustion engine and a generator. The engine supplies the generator with mechanical power and the generator converts it into electrical power for the electrical system consumption.

As the number of electrical components increase, the generator's electrical output power must also increase. This is accomplished by either increasing the size of the generator or employing multiple generators in the vehicle electrical system. In a vehicle electrical system where two generators are utilized to meet the electrical power demand, sequential power delivery is desirable because concurrent power delivery can lead to oscillation between the two generators. In a vehicle electrical system where two generators are coupled with two electrical subsystems in parallel, electrical power demand causes the two generators to compete for electrical power delivery and, hence, electrical power generation oscillates between the two generators.

The two generators are, in turn, coupled with one or more prime movers, such as an internal combustion engine or a hydraulic engine. In a vehicle electrical system where the first generator is coupled with an internal combustion engine and the second with a hydraulic engine, it is desirable to provide electrical power to the electrical subsystems sequentially, first from the first generator and then from the second generator. It is well known that internal combustion engines are more efficient in power conversion than hydraulic engines and as such it would be more efficient to draw electrical power from the first generator first and engage the second generator only when the first generator is overloaded.

Aside from efficiency considerations, it may be further desirable to utilize the first generator more often than the second. This is because the coupling mechanism, typically a belt drive mechanism, between the first generator and internal combustion engine, is easier to assemble and less expensive to replace, than the components utilized in a coupling mechanism between the second generator and hydraulic engine. As such, it is desirable to configure the vehicle electrical system where electrical power delivery is sequential, i.e., first from the first generator and second from the second generator, hence most of the operating hours are accumulated by the first generator. Additionally, in applications where acoustic noise minimization is a significant part of the vehicle electrical system, it is desirable to sequentially use the generator that is coupled with the prime mover which produces the least audible noise before engaging the other generator.

Conventional voltage regulators operate to maintain the output voltage of the generator at a constant voltage. As the number and operational complexities of electronic components in the vehicle electrical system increase, the voltage regulator must accordingly provide system monitoring and protection in addition to voltage regulation. As such, control devices are utilized that couple with generators to monitor and manage electrical power distribution throughout the electrical system in addition to maintaining the output voltage of the generator at a regulation/common/system voltage.

For instance, the commonly assigned U.S. Pat. No. 7,276,804, entitled "Voltage Regulator With Improved Protection and Warning System," and its progenies, hereby incorporated by reference in their entireties, discloses a vehicle electrical system voltage regulator with improved electrical protection and warning means that discerns and responds to regulator, generator, or vehicle electrical system operation and malfunctions. The regulator includes monitoring, control, and protection circuits with a phase signal monitor, a field switching circuit that operates the field coil in response to electrical power demands, and a field enable switch in series with the field regulating switch. The phase monitor and protection circuit ascertains and transmits generator rotational motion for use by the monitoring and control circuit in discerning the various operating conditions. The monitoring and control circuit operates on the field switching circuit to meet the electrical power demands and provide multi level fault protection to include field switching circuit reconfiguration to continue operating under various fault conditions. A warning and diagnostic system incorporating visual indicators and communication lines provide descriptive system information for use by the vehicle's operator and computer network, respectively.

In the commonly assigned U.S. Pat. No. 7,466,107, entitled "System and Method for Electric Current and Power Monitoring and Control of a Generator," its progenies, hereby incorporated by reference in their entireties, the control device measures a voltage drop across a conductor in a generator to determine and control the total generator output current. A temperature of the conductor is also measured to improve the accuracy. The control device may further improve on the accuracy by compensating for the electrical current through a field coil that may power the generator. The control device may be used in combination with a generator in a vehicle electrical system. Other system parameters may be monitored to improve on the system monitoring, diagnostics, and control.

The present electrical system further provides for monitoring and control of the electrical system. Specifically, the voltage regulators operate to measure battery type and temperature and adjust the regulation voltage accordingly. The electrical system also may be configured so that the voltage regulators can communicate system information with one another or the vehicle computer system. Furthermore, the voltage regulators are configured to sense system voltage at various points so as to insure safe and proper operation of the vehicle electrical system and the electronic components within the electrical system. In addition to monitoring multiple system voltage sense signals, the regulators may be configured to monitor their corresponding generator's output power controller, such as monitoring the duty cycle of the generator's field coil, in order to improve the diagnostic process.

Although various systems have been proposed which touch upon some aspects of the above problems, they do not provide solutions to the existing limitations in providing electrical power sequentially from two generators, while isolating two or more associated electrical subsystems and protecting against overcharging said electrical subsystems. For example, the Wolf patent, U.S. Pat. No. 7,335,998 entitled "Device for Supplying Voltage to the Loads of an Onboard Electrical System of a Motor Vehicle, Using a Plurality of Generators" discloses a device for supplying voltage to the loads of an onboard electrical system of a motor vehicle which includes a first generator, a regulator allocated to the first generator, a second generator, a regulator allocated to the second generator, and a control apparatus. The control apparatus is connected to at least one, and possibly to both, of the regulators, and the control apparatus supplies these regulators with control signals on the basis of which the loading of the generators is compensated. However, the generators in the Wolf electrical system provide electrical power concurrently and suffer from the same shortcomings of undesirable electrical power oscillation and lower efficiency that are eliminated using sequential electrical power delivery.

In Farber et al., U.S. Pat. No. 4,757,249 entitled "Vehicle Dual Electrical System" a vehicle electrical system includes dual alternator/battery sets separately connected to separate non-critical electrical loads, and both connected through a diode circuit to a critical electrical load. A starter switch connects both batteries to the engine starter motor. Although the disclosure discusses two generators supplying electrical power to a critical load via a diode, the electrical system is not configured for sequential electrical power delivery, or more specifically, the two generators do not operate sequentially.

The Stroud patent, U.S. Pat. No. 4,347,473 entitled "Dual alternator power system for motor vehicle" discloses an emergency vehicle having dual batteries, one of which is employed for supplying power to the electrical system of the vehicle chassis and the other of which is employed for supplying power to the emergency equipment, dual alternators driven by the engine are provided for charging the batteries. The output of each alternator is connected to the input of its regulator and to both batteries whereby both alternators will be on at all times when the engine is running and will share the load on either or both batteries. However, the Stroud system provides no sequencing control over the two generators and as such it suffers from the same limitations as discussed above.

In an electrical system, such as the one disclosed here, where two or more generators are used to provide electrical power to the electrical system, it is desirable to draw electrical power from the generators sequentially. Where two or more electrical subsystems are present, it is further desirable to isolate the electrical subsystems so that one or more of the electrical subsystems may be dedicated to serve the operational conditions of the vehicle. Where sequential electrical power delivery and isolation are required in an electrical system, protection against overcharging the electrical subsystems becomes an essential aspect of the electrical system.

The present electrical system is configured to address all of the limitations of conventional electrical systems as discussed above. In addition to sequential power delivery, the electrical system may be configured to accommodate two or more electrical subsystems and provide electrical isolation between the two electrical subsystems. Where two or more electrical subsystems are present, the present electrical system may be configured to prevent overcharging the electrical subsystems by monitoring their corresponding charging voltages. Although not a limitation, it is desirable, and the present system may be configured, to utilize two identical voltage regulators so as to reduce the costs of parts, service, and maintenance of the electrical system. Monitoring of various voltages at various sense points is made in order to insure proper voltage regulation of the electrical system. The present system may be further configured to monitor the generators' output power controllers to improve the diagnostic process.

SUMMARY

In one aspect, a vehicle electrical system is disclosed which operates to electrically isolate two or more electrical subsystems, to protect against overcharging the two or more electrical subsystems, and to provide electrical power to the two or more electrical subsystems sequentially from a first and second generators. The vehicle electrical system comprises the first and second generators and first and second voltage regulators. The first generator is coupled with the two or more electrical subsystems, each of which includes at least one of a stored energy source and electrical load, via a means for isolating. The second generator is coupled with one of the two or more electrical subsystems, via a means for sequencing, operative to introduce a change in voltage between the second generator and the one of the two or more electrical subsystems. The first voltage regulator is coupled with the first generator and operative to sense two or more first-regulator-electrical-subsystems-sense voltages of the two or more electrical subsystems and regulate an output voltage of the first generator at a first regulation voltage in response to the highest voltage of the two or more first-regulator-electrical-subsystems-sense voltages. The second voltage regulator is coupled with the second generator and operative to sense a second-regulator-generator-output-sense voltage of an output terminal of the second generator and regulate an output voltage of the second generator at the first regulation voltage in response to the second-regulator-generator-output-sense voltage.

According to one preferred embodiment the means for isolating comprises two or more diodes.

According to one preferred embodiment the means for sequencing comprises one of a diode, an integrated circuit, an electrical cable.

According to one preferred embodiment the two or more electrical subsystems comprise at least one stored energy source and the system further comprises means to generate a first signal indicative of a temperature of the stored energy source and wherein at least one of the first and second voltage regulators further operates to sense the first signal and modify the first regulation voltage according to the first signal. Preferably at least one of the first and second voltage regulators further operates to generate an error signal indicative of a fault condition, via a means for communicating, when the first signal is outside of a predetermined range. Preferably, the means for communicating is one of a light emitting diode and vehicle computer system I/O port. Preferably, the first voltage regulator further operates to sense a first-regulator-energize-sense voltage of an energize terminal and regulate the output voltage of the first generator at the first regulation voltage in response to the first-regulator-energize-sense voltage, when the first signal is outside of a predetermined range. Preferably, the means to generate the first signal is one of a thermistor disposed in proximity of the stored energy source, an internal voltage regulator temperature sensor, and vehicle computer system I/O port. Preferably, the modification of the first regulation voltage is achieved via a lookup table. Preferably, the first regulation voltage is modified according to a default temperature when the first signal is outside of a predetermined range. Preferably, the system further comprises means to generate a second signal indicative of a type of the stored energy source and wherein at least one of the first and second voltage regulators further operates to sense the second signal and further modify the first regulation voltage according to the second signal. Preferably, the means to generate the second signal is one of a switch and vehicle computer system I/O port.

According to one preferred embodiment, at least one of the first and second voltage regulators further operates to generate an error signal indicative of a fault condition, via a means for communicating, when the lowest voltage of the two or more first-regulator-electrical-subsystems-sense voltages is less than a predetermined value.

According to one preferred embodiment, the first voltage regulator further operates to sense a first-regulator-energize-sense voltage of an energize terminal and regulate the output voltage of the first generator at the first regulation voltage in response to the first-regulator-energize-sense voltage, when the lowest voltage of the two or more first-regulator-electrical-subsystems-sense voltages is less than a predetermined value.

According to one preferred embodiment, the first voltage regulator further operates to activate an over-voltage-cut-out circuit when the highest voltage of the two or more first-regulator-electrical-subsystems-sense voltages is greater than a predetermined value.

According to one preferred embodiment, the first voltage regulator further operates to sense a first-regulator-isolator-input-sense voltage of an input terminal of the means for isolating and activate an over-voltage-cut-out circuit when the first regulator-isolator-input-sense voltage is greater than a first predetermined value. Preferably, at least one of the first and second voltage regulators further operates to generate an error signal indicative of a fault condition, via a means for communicating, when the first-regulator-isolator-input-sense voltage is greater than the lowest voltage of the two or more first-regulator-electrical-subsystems-sense voltages by a second predetermined value. Preferably, the first voltage regulator further operates to sense a first-regulator-energize-sense voltage of an energize terminal and regulate the output voltage of the first generator at the first regulation voltage in response to the first-regulator-energize-sense voltage, when the first-regulator-isolator-input-sense voltage is greater than the lowest voltage of the two or more first-regulator-electrical-subsystems-sense voltages by a second predetermined value. Preferably, at least one of the first and second voltage regulators further operates to generate an error signal indicative of a fault condition, via a means for communicating, when the first-regulator-isolator-input-sense voltage is less than a second predetermined value and a duty cycle of the first generator field current is greater than a third predetermined value. Preferably, the first voltage regulator further operates to sense a first-regulator-energize-sense voltage of an energize terminal and regulate the output voltage of the first generator at the first regulation voltage in response to the first-regulator-energize-sense voltage, when the first-regulator-isolator-input-sense voltage is less than a second predetermined value and a duty cycle of the first generator field current is greater than a third predetermined value.

According to one preferred embodiment, the first voltage regulator further operates to sense a first-regulator-energize-sense voltage of an energize terminal and activate an over-voltage-cut-out circuit when the first-regulator-energize-sense voltage is greater than a predetermined value.

In another aspect, a vehicle electrical system is disclosed which operates to electrically isolate two or more electrical subsystems and to provide electrical power to the two or more electrical subsystems sequentially from a first and second generators. The vehicle electrical system comprises the first and second generators and first and second voltage regulators. The first generator is coupled with the two or more electrical subsystems, each of which includes at least one of a stored energy source and electrical load, via a means for isolating. The second generator is coupled with one of the two or more electrical subsystems, via a means for sequencing, operative to introduce a change in voltage between the second generator and the one of the two or more electrical subsystems. The first voltage regulator is coupled with the first generator and operative to sense a first-regulator-electrical subsystems-sense voltage of one of the two or more electrical subsystems and regulate an output voltage of the first generator at a first regulation voltage in response to the first-regulator-electrical subsystems-sense voltage. The second voltage regulator is coupled with the second generator and operative to sense a second-regulator-generator-output-sense voltage of an output terminal of the second generator and regulate an output voltage of the second generator at the first regulation voltage in response to the second-regulator-generator-output-sense voltage.

In another aspect, a vehicle electrical system is disclosed which operates to provide electrical power to an electrical subsystem sequentially from a first and second generators. The vehicle electrical system comprises the first and second generators and first and second voltage regulators. The first generator is coupled with the electrical subsystem comprising at least one of a stored energy source and electrical load. The second generator is coupled with the electrical subsystem, via a means for sequencing, operative to introduce a change in voltage between the second generator and electrical subsystem. The first voltage regulator is coupled with the first generator and operative to sense a first-regulator-electrical-subsystem-sense voltage of the electrical subsystem and regulate an output voltage of the first generator at a first regulation voltage in response to the first-regulator-electrical-subsystem-sense voltage. The second voltage regulator is coupled with the second generator and operative to sense a second-regulator-generator-output-sense voltage of an output terminal of the second generator and regulate an output voltage of the second generator at the first regulation voltage in response to the second-regulator-generator-output-sense voltage.

In another aspect, a method for electrically isolating, protecting against overcharging, and providing electrical power, sequentially from a first and second generators, to two or more electrical subsystems in a vehicle electrical system is disclosed, wherein each of said electrical subsystems comprising at least one of a stored energy source and electrical load, said first generator coupled with the two or more electrical subsystems via a means for isolating, said second generator coupled with one of the two or more electrical subsystems, via a means for sequencing operative to introduce a change in voltage between the second generator and the one of the two or more electrical subsystems. The method comprises (i) sensing two or more first-regulator-electrical-subsystems-sense voltages of the two or more electrical subsystems, via a first voltage regulator coupled with the first generator, (ii) regulating an output voltage of the first generator at a first regulation voltage in response to the highest voltage of the two or more first-regulator-electrical-subsystems-sense voltages, via the first voltage regulator, (iii) sensing a second-regulator-generator-output-sense voltage of an output terminal of the second generator, via a second voltage regulator coupled with the second generator, and (iv) regulating an output voltage of the second generator at the first regulation voltage in response to the second-regulator-generator-output-sense voltage, via the second voltage regulator.

According to one preferred embodiment, the two or more electrical subsystems comprise at least one stored energy source and the system further comprises means to generate a first signal indicative of a temperature of the stored energy source. The method further comprises (v) sensing the first signal, via at least one of the first and second voltage regulators, and (vi) modifying the first regulation voltage according to the first signal, via at least one of the first and second voltage regulators.

According to one preferred embodiment, the method further comprises (vii) generating an error signal indicative of a fault condition, when the first signal is outside of a predetermined range, via a means for communicating.

According to one preferred embodiment, the method further comprises (vii) sensing a first-regulator-energize-sense voltage of an energize terminal, via the first voltage regulator, and (viii) regulating the output voltage of the first generator at the first regulation voltage in response to the first-regulator-energize-sense voltage, when the first signal is outside of a predetermined range, via the first voltage regulator.

According to one preferred embodiment, the system further comprises means to generate a second signal indicative of a type of the stored energy source and the method further comprises (vii) sensing the second signal, via at least one of the first and second voltage regulators, and (viii) modifying the first regulation voltage according to the second signal, via at least one of the first and second voltage regulators.

According to one preferred embodiment, the method further comprises (v) generating an error signal indicative of a fault condition when the lowest voltage of the two or more first-regulator-electrical-subsystems-sense voltages is less than a predetermined value, via a means for communicating.

According to one preferred embodiment, the method further comprises (v) sensing a first-regulator-energize-sense voltage of an energize terminal, via the first voltage regulator, and (vi) regulating the output voltage of the first generator at the first regulation voltage in response to the first-regulator-energize-sense voltage, when the lowest voltage of the two or more first-regulator-electrical-subsystems-sense voltages is less than a predetermined value, via the first voltage regulator.

According to one preferred embodiment, the method further comprises (v) activating an over-voltage-cut-out circuit when the highest voltage of the two or more first-regulator-electrical-subsystems-sense voltages is greater than a predetermined value, via the first voltage regulator.

According to one preferred embodiment, the method further comprises (v) sensing a first-regulator-isolator-input-sense voltage of an input terminal of the means for isolating, via the first voltage regulator, and (vi) activating an over-voltage-cut-out circuit when the first regulator-isolator-input-sense voltage is greater than a first predetermined value, via the first voltage regulator.

According to one preferred embodiment, the method further comprises (vii) generating an error signal indicative of a fault condition when the first-regulator-isolator-input-sense voltage is greater than the lowest voltage of the two or more first-regulator-electrical-subsystems-sense voltages by a second predetermined value, via a means for communicating.

According to one preferred embodiment, the method further comprises (vii) sensing a first-regulator-energize-sense voltage of an energize terminal, via the first voltage regulator, and (viii) regulating the output voltage of the first generator at the first regulation voltage in response to the first-regulator-energize-sense voltage, when the first-regulator-isolator-input-sense voltage is greater than the lowest voltage of the two or more first-regulator-electrical-subsystems-sense voltages by a second predetermined value, via the first voltage regulator.

According to one preferred embodiment, the method further comprises (vii) generating an error signal indicative of a fault condition when the first-regulator-isolator-input-sense voltage is less than a second predetermined value and a duty cycle of the first generator field current is greater than a third predetermined value, via a means for communicating.

According to one preferred embodiment, the method further comprises (vii) sensing a first-regulator-energize-sense voltage of an energize terminal, via the first voltage regulator, and (viii) regulating the output voltage of the first generator at the first regulation voltage in response to the first-regulator-energize-sense voltage, when the first-regulator-isolator-input-sense voltage is less than a second predetermined value and a duty cycle of the first generator field current is greater than a third predetermined value, via the first voltage regulator.

According to one preferred embodiment, the method further comprises (v) sensing a first-regulator-energize-sense voltage of an energize terminal, via the first voltage regulator, and (vi) activating an over-voltage-cut-out circuit when the first-regulator-energize-sense voltage is greater than a predetermined value, via the first voltage regulator.

In another aspect, a method for electrically isolating and providing electrical power, sequentially from a first and second generators, to two or more electrical subsystems in a vehicle electrical system is disclosed, wherein each of said electrical subsystems comprising at least one of a stored energy source and electrical load, said first generator coupled with the two or more electrical subsystems via a means for isolating, said second generator coupled with one of the two or more electrical subsystems, via a means for sequencing operative to introduce a change in voltage between the second generator and the one of the two or more electrical subsystems. The method comprises (i) sensing a first-regulator-electrical subsystems-sense voltage of one of the two or more electrical subsystems, via a first voltage regulator coupled with the first generator, (ii) regulating an output voltage of the first generator at a first regulation voltage in response to the first-regulator-electrical subsystems-sense voltage, via the first voltage regulator, (iii) sensing a second-regulator-generator-output-sense voltage of an output terminal of the second generator, via a second voltage regulator coupled with the second generator, and (iv) regulating an output voltage of the second generator at the first regulation voltage in response to the second-regulator-generator-output-sense voltage, via the second voltage regulator.

In another aspect, a method for providing electrical power, sequentially from a first and second generators, to an electrical subsystem wherein said electrical subsystem comprising at least one of a stored energy source and electrical load in a vehicle electrical system is disclosed, said first generator coupled with the electrical subsystem, said second generator coupled with the electrical subsystem, via a means for sequencing operative to introduce a change in voltage between the second generator and the electrical subsystem. The method comprises (i) sensing a first-regulator-electrical-subsystem-sense voltage of the electrical subsystem, via a first voltage regulator coupled with the first generator, (ii) regulating an output voltage of the first generator at a first regulation voltage in response to the first-regulator-electrical subsystem-sense voltage, via the first voltage regulator, (iii) sensing a second-regulator-generator-output-sense voltage of an output terminal of the second generator, via a second voltage regulator coupled with the second generator, and (iv) regulating an output voltage of the second generator at the first regulation voltage in response to the second-regulator-generator-output-sense voltage, via the second voltage regulator.

DETAILED DESCRIPTION OF THE PRESENTLY PREFERRED EMBODIMENTS

Figure 1:
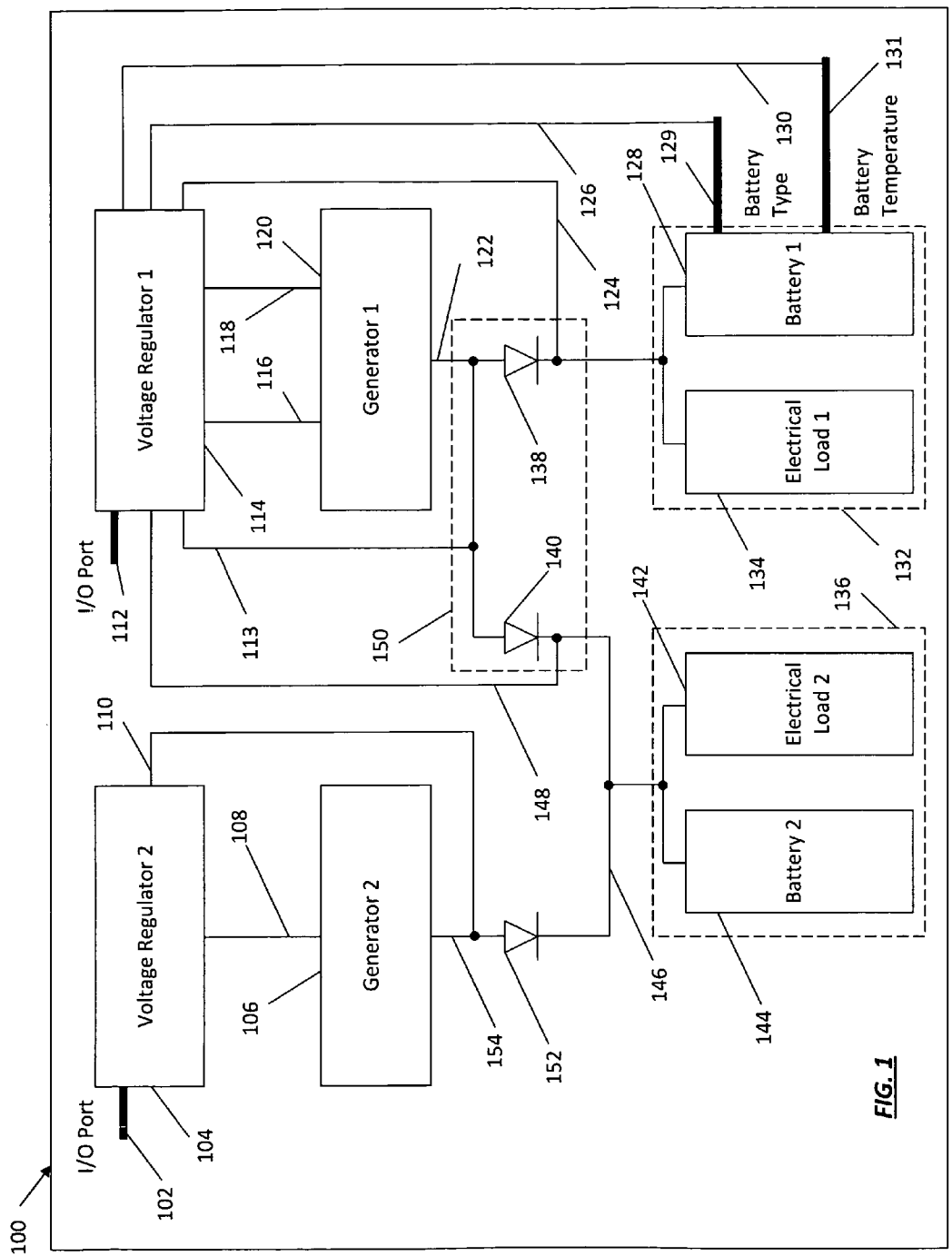
FIG. 1 shows a block diagram of a vehicle electrical system comprising two generators, two voltage regulators, two electrical subsystems, an isolating means coupled with one of the generators and electrical subsystems, and a sequencing means coupled with the other generator and one of the two electrical subsystems according to a preferred embodiment.

FIG. 1 depicts a block diagram of a preferred embodiment of a vehicle electrical system 100, including a first generator 120, a second generator 106, and their associated voltage regulators 114 and 104, respectively. The first generator 120 is coupled with two electrical subsystems 132 and 136 via an isolating means 150. The second generator 106 is coupled with one of the two electrical subsystems 136 via a means for sequencing 152. Both voltage regulators 104 and 114 comprise an I/O port, 112 and 102, which may be coupled with the vehicle computer system (not shown) where the two regulators can communicate with one another or the vehicle computer system. The first electrical subsystem 132 comprises a first electrical load 134 and a first battery 128. The second electrical subsystem 136 comprises a second electrical load 142 and a second battery 144. The first battery 128 further comprises a battery-type output terminal 129 where a signal is generated that indicates the type of the first battery 128, and a battery-temperature output terminal 131 where a signal is generated that indicates the temperature of the first battery 128. The isolating means 150 comprises two diodes 138 and 140 and the sequencing means also comprises a diode 152. As known to artisans of ordinary skill, other devices such as integrated circuits or electrical cables, individually or in combinations, could be utilized as the means for isolating and sequencing, 150 and 152, respectively. The first and second electrical loads 134 and 142 represent electrical loads by electrical components within the vehicle electrical system which may comprise a starter motor, a heating element, an air conditioning unit, a compressor, a cooling fan, headlights, or a pump, to name a few examples.

The first voltage regulator 114 is connected to and in communication with the first generator 120 via lines 116 and 118. The line 116 is coupled with an output power controller, such as a field coil (not shown but known to artisans of ordinary skill) of the first generator 120 through which the first voltage regulator 114 maintains the output voltage of the first generator 120 at a regulation voltage by varying a duty cycle of the generator's output power controller. The line 118 is utilized to measure a voltage $v_E$ at the generator's energize terminal which the voltage regulator may use to regulate the output voltage of the first generator 120. As it will be explained in more detail below, the primary sources for voltage regulation are the voltages at the first and second electrical subsystems 132 and 136 which are available to the first voltage regulator 114 through the lines 124 and 148. The energize voltage $v_E$ on line 118 is used when an inconsistency or a fault occurs.

The first voltage regulator 114 is coupled with the means for isolating 150 and the two electrical subsystems 132 and 136, via lines 113, 124 and 148. Specifically, the first voltage regulator 114 utilizes the line 113 to sense the voltage at the input of the means for isolating 150, and the lines 124 and 148 to sense the voltages at the outputs of the means for isolating 150 which is the same as the input to the first and second electrical subsystems 132 and 136, respectively. The first voltage regulator 114 senses two voltages, $v_{11}$ and $v_{12}$, at the input to the two electrical subsystems 132 and 136 and varies the duty cycle of the field current through the field coil of the first generator 120 to maintain the highest of the two voltages $v_{11}$ and $v_{12}$ at the regulation voltage $v_r$. The first voltage regulator 114 activates an over voltage cut out circuit when said highest of the two voltages $v_{11}$ and $v_{12}$ is greater than a predetermined value. Additionally, the first voltage regulator 114 may sense the voltage $v_{IS}$ at the input to the means for isolating 150, via the line 113, and activate the over voltage cut out circuit when $v_{IS}$ is above a threshold value. In another instance, the first voltage regulator activates the over voltage cut out circuit when the energize voltage $v_E$ is above a preset value.

The first voltage regulator 114 is further connected to the first battery 128, via lines 129 and 131, in order to detect the type and temperature of the first battery 128, respectively. The regulation voltage $v_r$ may be modified as a function of the battery type and temperature. In one instance, the modification is achieved by use of a look-up table. A thermistor disposed in proximity of the first battery 128 or the housing of the first voltage regulator 114 may be used to measure the temperature.

The first voltage regulator 114 generates an error signal via its I/O port 112 when the measured temperature of the first battery 128 is outside of a predetermined range. In such a case, the first voltage regulator may either use a default temperature for the purpose of modifying the regulation voltage $v_r$, or sense and utilize a voltage at an energize terminal.

Battery type maybe determined via a switch or the vehicle computer system. The first voltage regulator 114 detects the position of the switch to ascertain the type of the first battery 128, or it may receive a signal from the vehicle computer system, via its I/O port, to recognize the battery type so as to modify the regulation voltage v, accordingly. The first voltage regulator 114 communicates system information, including voltages at various points, electrical current, field current duty cycle, battery temperature and type, or other operational parameters to the vehicle computer system or the second voltage regulator 104.

The first voltage regulator 114 uses the voltage at the energize terminal to regulate the output voltage of the first generator 120 at the regulation voltage $v_r$ when the lowest voltage of the two voltages $v_{11}$ and $v_{12}$ is less than a predetermined value. The first voltage regulator 114 also generates an error signal indicative of such fault condition. In another instance, the first voltage regulator 114 utilizes the voltage at the energize terminal for voltage regulation when the voltage $v_{IS}$ at the input to the means for isolating 150 is greater than the lowest voltage of the two voltages $v_{11}$ and $v_{12}$ by a threshold value. In yet another instance, the first voltage regulator 114 utilizes the voltage at the energize terminal for voltage regulation when the voltage $v_{IS}$ is less than a first threshold value and a duty cycle of the field current of the first generator 120 is greater than a second threshold value. The first voltage regulator 114 monitors these voltages at various locations and smartly uses the one that, in its best estimate, likely represents the actual operating condition. Either or both the first voltage regulator 114 and the second voltage regulator 104 generate an error signal when a fault or inconsistency occurs.

The means for isolating 150 allows the first generator 120 to provide electrical power to the first and second electrical subsystems 132 and 136 while preventing the flow of electrical power from said electrical subsystems to one another or to the first generator 120. As such the two electrical subsystems 132 and 136 are electrically isolated. As known to artisans of ordinary skill, the first voltage regulator 114 varies the duty cycle of the generator's field current in response to a sense voltage in an effort to maintain the sensed voltage at a regulation voltage. Either of the two voltages $v_{11}$ and $v_{12}$ may be used as the sensed voltage to achieve voltage regulation.

The first voltage regulator 114 operates to regulate the output voltage of the first generator 120. The first voltage regulator 114, however, uses the maximum value of $v_{11}$ and $v_{12}$ so as to prevent overcharging the two electrical subsystems 132 and 136. In many applications, it is essential not to overcharge the batteries in the electrical system. The present electrical system utilizes two diodes, 138 and 140, to achieve electrical isolation between the electrical subsystems 132 and 136. When electrical current passes through the diodes 138 and 140, there are associated voltage drops across said diodes. The higher the electrical current through the diode, the higher the voltage drop. For instance, if the first electrical subsystem 132 draws the maximum electrical current, then the associated voltage drop across the diode 138 is higher than the one across the diode 140, hence, $v_{12}$ is greater than $v_{11}$. The first voltage regulator 114 utilizes this voltage, i.e., $v_{12}$ to regulate the output voltage of the first generator 120. This scheme insures that the electrical subsystem with the lowest electrical power requirement is not overcharged. In this instance, the second electrical subsystem 136 draws the least electrical current but by utilizing the maximum value of the two sensed voltages $v_{11}$ and $v_{12}$, the voltage regulator 114 is prevented from increasing the duty cycle of the field current of the field coil of the first generator 120 to the point of overcharging the second electrical subsystem 136.

The second voltage regulator 104 is connected to and in communication with the second generator 106 via the line 108. The line 108 is coupled with an output power controller, such as a field coil (not shown but known to artisans of ordinary skill) of the second generator 104 through which the second voltage regulator 104 maintains the output voltage of the second generator 104 at the regulation voltage v, by varying a duty cycle of the generator's output power controller. Although, the second voltage regulator 104 may be configured to regulate the output voltage of the second generator 106 at a different regulation voltage, such system configuration would require two different voltage regulators.

The present electrical system is advantageously configured so as to allow one to use two voltage regulators with the same voltage regulation value. Specifically, the sense point, at which the second voltage regulator 104 measures the voltage for purposes of voltage regulation, is chosen to be at the input to the diode 152, $v_{SE}$, which is the same point as the output terminal 154 of the second generator 106. This is because the voltage at the output of the diode 152, i.e., $v_{21}$, is the same as that of the voltage at the output of diode 140, i.e., $v_{12}$. Since $v_{SE}$ is always greater than $v_{21}$ due to electrical current flow through the diode 152 and the associated voltage drop, the second generator 106 does not produce electrical power until the second electrical subsystem 136 is loaded beyond the capability of the first generator 120. Such overload causes $v_{SE}$ to approach $v_r$ at which point, the second generator 106 commences to produce electrical power to the second electrical subsystem 136, hence effectuating a sequential power delivery. Artisans of ordinary skill should know that selection of the second electrical subsystem 136 for sequential electrical power delivery is not a limitation of the present electrical system and the first electrical subsystem could have been chosen for such purpose. Furthermore, although only two electrical subsystems are used in this embodiment, multiple electrical subsystems could be incorporated and sequential power delivery could be accordingly achieved for designated electrical subsystems.

In the present embodiment, the second voltage regulator 104 is identical to the first voltage regulator 114 and comprises identical input and output lines. As such, the line 110, corresponding to that of line 124 for the first voltage regulator 114, is utilized to sense the voltage $v_{SE}$ at the input to the diode 152 and the other sense lines (not shown for clarity) could be either kept disconnected, or advantageously connected to other locations so as to provide for detection of additional input values and control of the electrical system. For instance, the other sense line (not shown) corresponding to that of line 148 could be either kept disconnected or connected to the input to the diode 152. The I/O port 102 of the second voltage regulator 104 maybe connected to the I/O port of the first voltage regulator 114 where the two voltage regulators share the system information, such as $v_{11}$, $v_{12}$, temperature and type of the first batter 128, so as to improve the monitoring and control of the electrical system.

Figure 2:
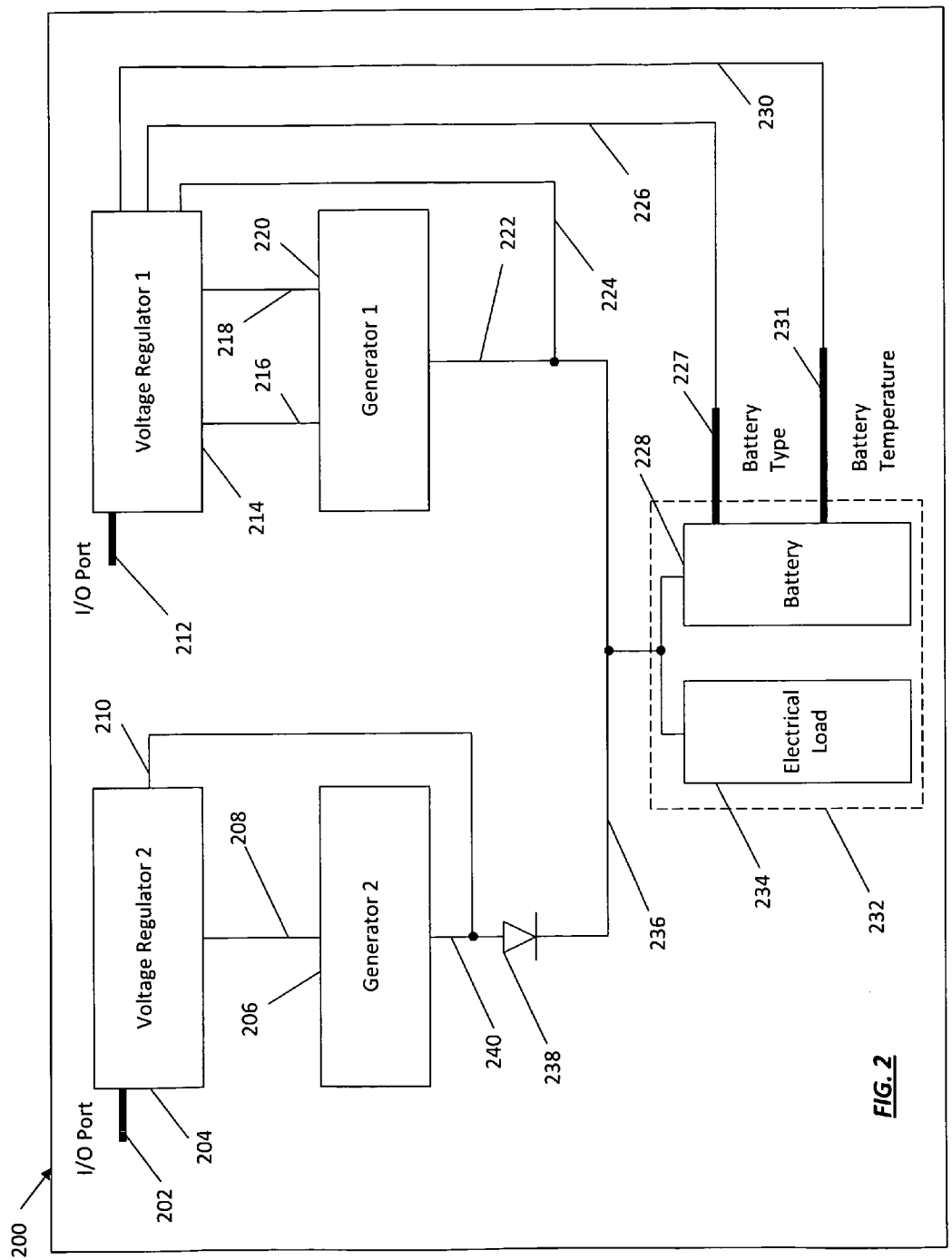
FIG. 2 shows a block diagram of a vehicle electrical system comprising two generators, two voltage regulators, an electrical subsystem coupled with one of the generators directly and the other generator via a sequencing means, according to a preferred embodiment.

FIG. 2 depicts a block diagram of a preferred embodiment of a vehicle electrical system 200, including a first generator 220, a second generator 206, and their associated voltage regulators 214 and 204, respectively. The first generator 220 is coupled with an electrical subsystem 232 directly. The second generator 206 is coupled with the electrical subsystem 232 via a means for sequencing 238. Both voltage regulators 204 and 214 comprise an I/O port, 212 and 202, which may be coupled with the vehicle computer system (not shown) where the two regulators can communicate with one another or the vehicle computer system. The electrical subsystem 232 comprises an electrical load 234 and a battery 228. The battery 228 further comprises a battery-type output terminal 227 where a signal is generated that indicates the type of the battery 228, and a battery-temperature output terminal 231 where a signal is generated that indicates the temperature of the battery 228. The sequencing means comprises a diode 238. As known to artisans of ordinary skill, other devices such as integrated circuits or electrical cables, individually or in combinations, could be utilized as the means for sequencing 238. The electrical load 234 represent electrical loads by electrical components within the vehicle electrical system which may comprise a starter motor, a heating element, an air conditioning unit, a compressor, a cooling fan, headlights, or a pump, to name a few examples.

The electrical system depicted in FIG. 2 operates similarly to that depicted in FIG. 1. Both first and second voltage regulators, 214 and 204 operate to regulate the output voltage of their respective generators 220 and 206, respectively. But in addition to voltage regulation, the present electrical subsystem is configured to provide electrical power to the electrical subsystem 232 sequentially, first from the first generator 220 and then from the second generator 206. This system configuration allows one to engage the second generator 206 only when the electrical power capacity of the first generator 220 has been exhausted. The only notable difference between the electrical systems of FIGS. 1 and 2 is the absence of electrical isolation between two or more electrical subsystems within the electrical system. In such applications, the electrical system of FIG. 2 facilitates the same monitoring and control of the various components within the vehicle electrical system without the need for an isolating means.

Figure 3:
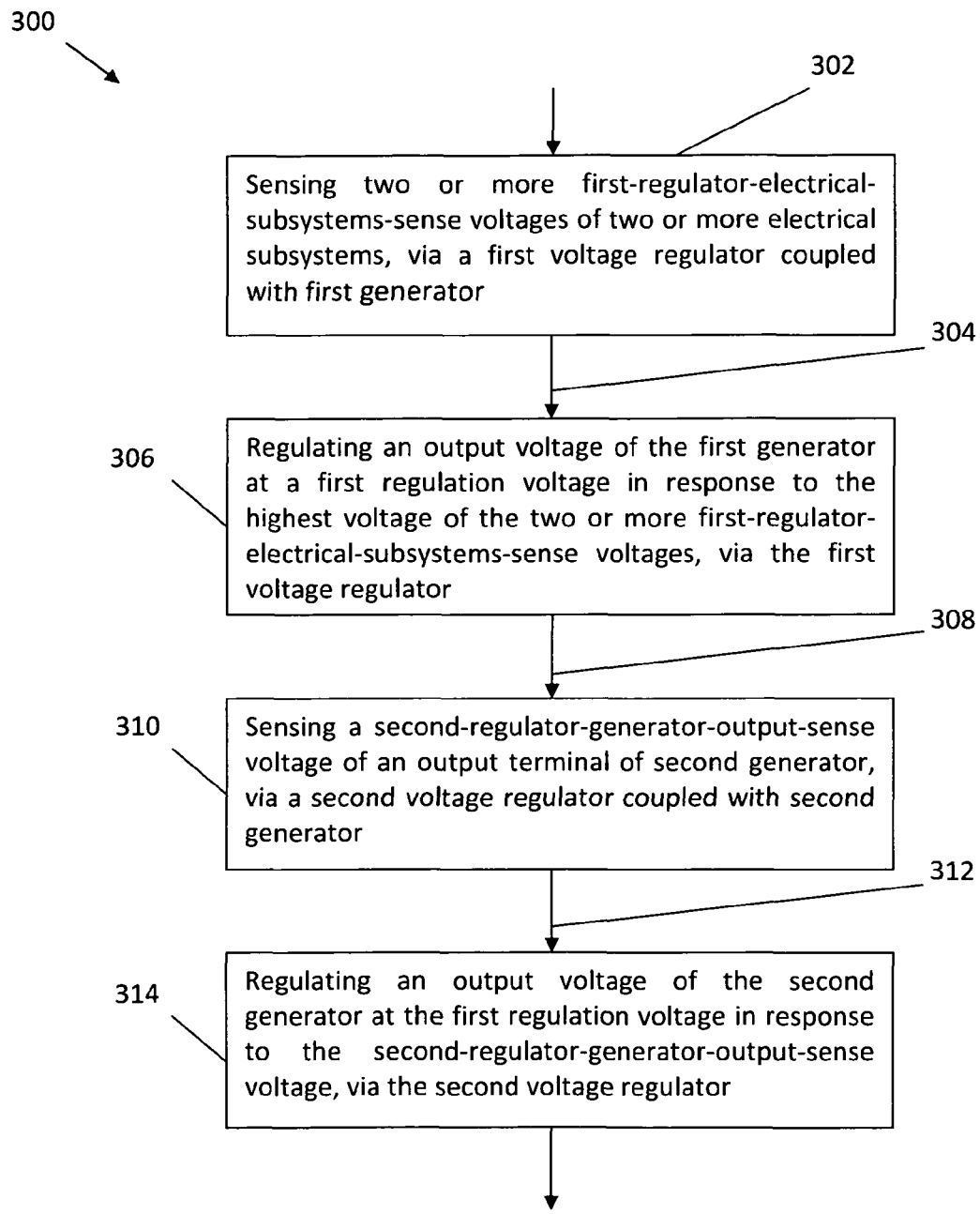
FIG. 3 is a flow diagram of one preferred method of operating a vehicle electrical system such as the one depicted in FIG. 1, by providing electrical power to the two or more electrical subsystems sequentially from the first and second generators while electrically isolating the two electrical subsystems and protecting against overcharging the two or more electrical subsystems.

FIG. 3 is a flow diagram 300 of one preferred method of operation of the vehicle electrical system of FIG. 1. According to this embodiment, the method comprises sensing two or more first-regulator-electrical-subsystems-sense voltages, such as the two voltages $v_{11}$ and $v_{12}$, via the first voltage regulator 114 which is coupled with the first generator 120, at 302. The method further comprises regulating the output voltage of the first generator 120, via the first voltage regulator 114, at a first regulation voltage, such as the voltage regulation $v_r$, in response to the highest value of the two voltages $v_{11}$ and $v_{12}$, at 306. The method further comprises sensing a second-regulator-generator-output-sense voltage, via the second voltage regulator 104 coupled with the second generator 106, such as the voltage $v_{SE}$ at the input to the diode 152 which is the same point as the output terminal 154 of the second generator 106, at 310. The method further comprises regulating the output voltage of the second generator 106, via the second voltage regulator 104, at the first regulation voltage $v_r$, in response to the voltage $v_{SE}$ at 314. According to this method, when implemented on a vehicle electrical system such as that depicted in FIG. 1, two generators 106 and 120 can provide electrical power to two electrical subsystems 132 and 136 sequentially while providing electrical isolation between said electrical subsystems, and protecting against overcharging the two electrical subsystems 132 and 136.

Figure 4:
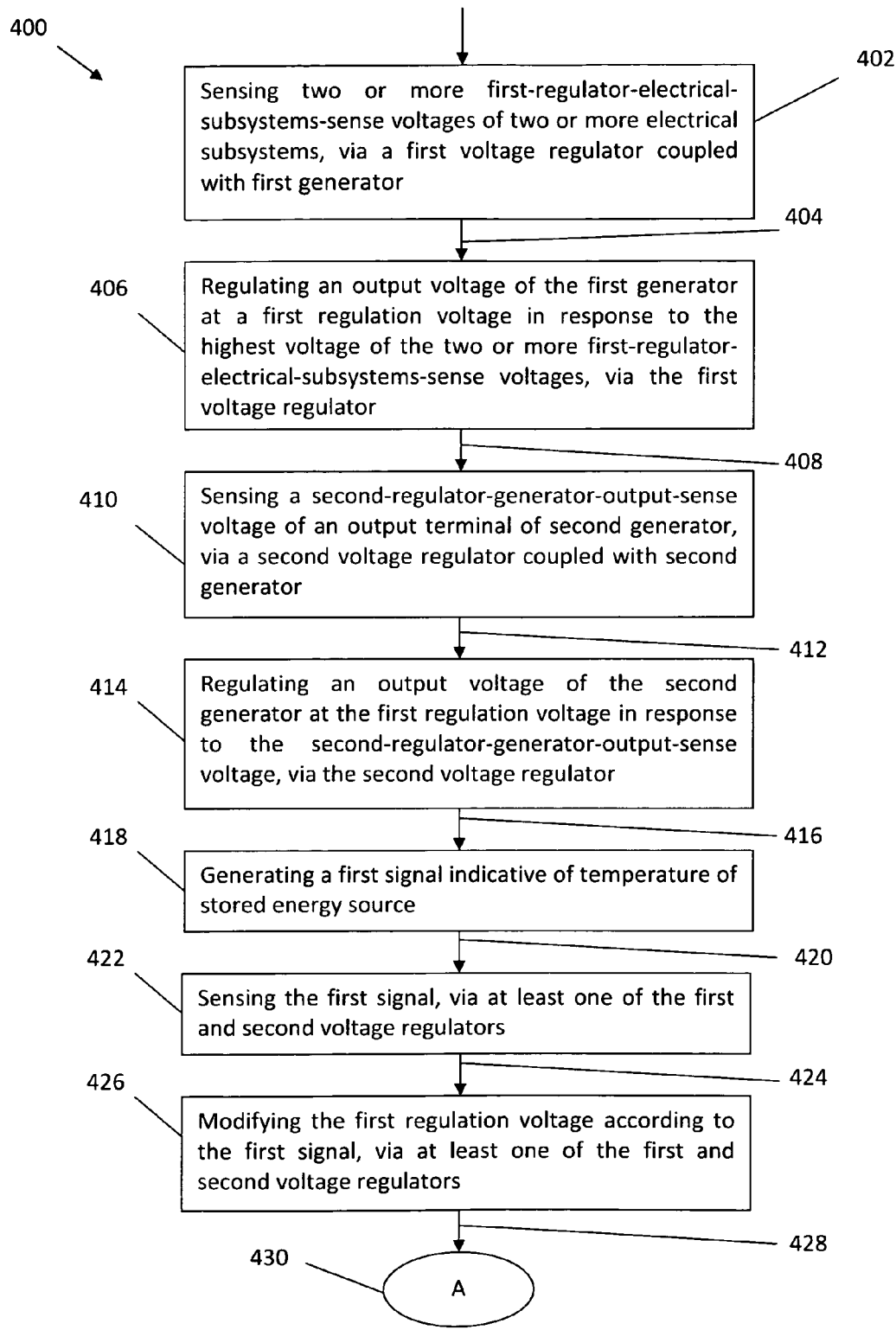
FIG. 4 is a flow diagram of one preferred method of operating a vehicle electrical system such as the one depicted in FIG. 1, which is similar to that of FIG. 3, further modifying the regulation voltage as a function of the temperature of a stored energy source included in one of the electrical subsystems.

FIG. 4 is a flow diagram 400 of a preferred method of operation of the vehicle electrical system of FIG. 1 further providing steps to monitor and respond to temperature changes of the battery 128. Specifically, according to this embodiment, the method comprises the same steps, 402 thru 414, as those discussed in relation with FIG. 3, but further comprises generating a first signal indicative of the temperature of the battery 128, at 418, sensing the first signal, via at least one of the first and second voltage regulators, 114 and 104 at 422, and modifying the regulation voltage $v_r$ according to the first signal via at least one of the first and second voltage regulators, 114 and 104 at 426.

Figure 4A:
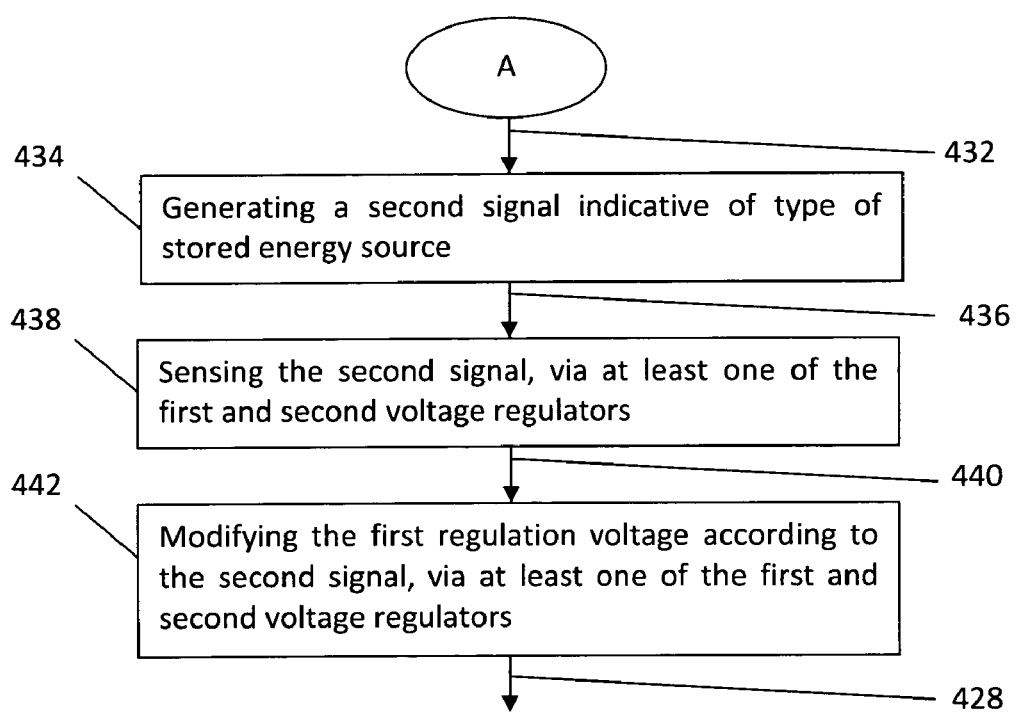
FIG. 4A is a flow diagram of one preferred method of operating a vehicle electrical system such as the one depicted in FIG. 1, which is similar to that of FIG. 4, further modifying the regulation voltage as a function of the type of the stored energy source.

FIG. 4A is a flow diagram that depicts additional steps that maybe added to the method of operation, depicted in FIG. 4, so as to provide monitoring and responding to the type of the battery being used. According to this preferred method of operation of the vehicle electrical system of FIG. 1 the method further comprises generating a second signal indicative of the type of the battery 128, at 434, sensing the second signal, via at least one of the first and second voltage regulators, 114 and 104 at 438, and modifying the regulation voltage $v_r$ according to the second signal via at least one of the first and second voltage regulators, 114 and 104 at 442.

Figure 5:
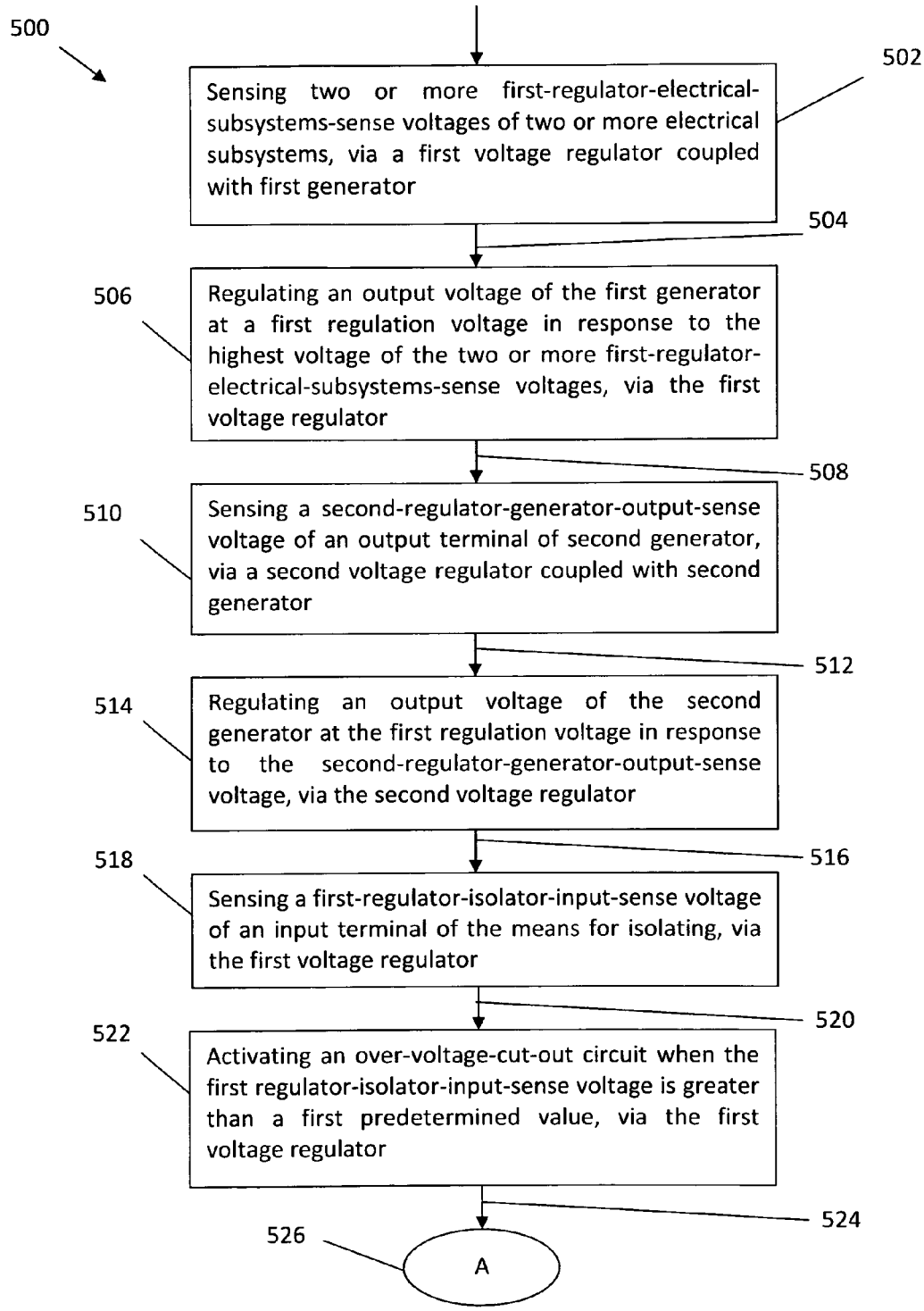
FIG. 5 is a flow diagram of one preferred method of operating a vehicle electrical system such as the one depicted in FIG. 1, which is similar to that of FIG. 3, further monitoring the voltage at an input terminal of the means for isolating and activating an Over Voltage Cut Out (OVCO) circuit if the voltage is above a threshold value.

FIG. 5 is a flow diagram 500 of a preferred method of operation of the vehicle electrical system of FIG. 1 further providing steps to monitor and respond to excessive voltages that may indicate faulty operation of the vehicle electrical system. Specifically, according to this embodiment, the method comprises the same steps, 502 thru 514, as those discussed in relation with FIG. 3, but further comprises sensing a first-regulator-isolator-input-sense voltage of an input terminal of the means for isolating 150, such as the voltage $v_{IS}$, via the first voltage regulator 114, at 518, and activating an over-voltage-cut-out (OVCO) circuit (not shown), when $v_{IS}$ is above a threshold value, at 522. Artisans of ordinary skill should know such OVCO circuits and the reader is referred to the above-mentioned U.S. Pat. Nos. 7,202,574 and 7,276,804 and their progenies for additional information.

Figure 5A:
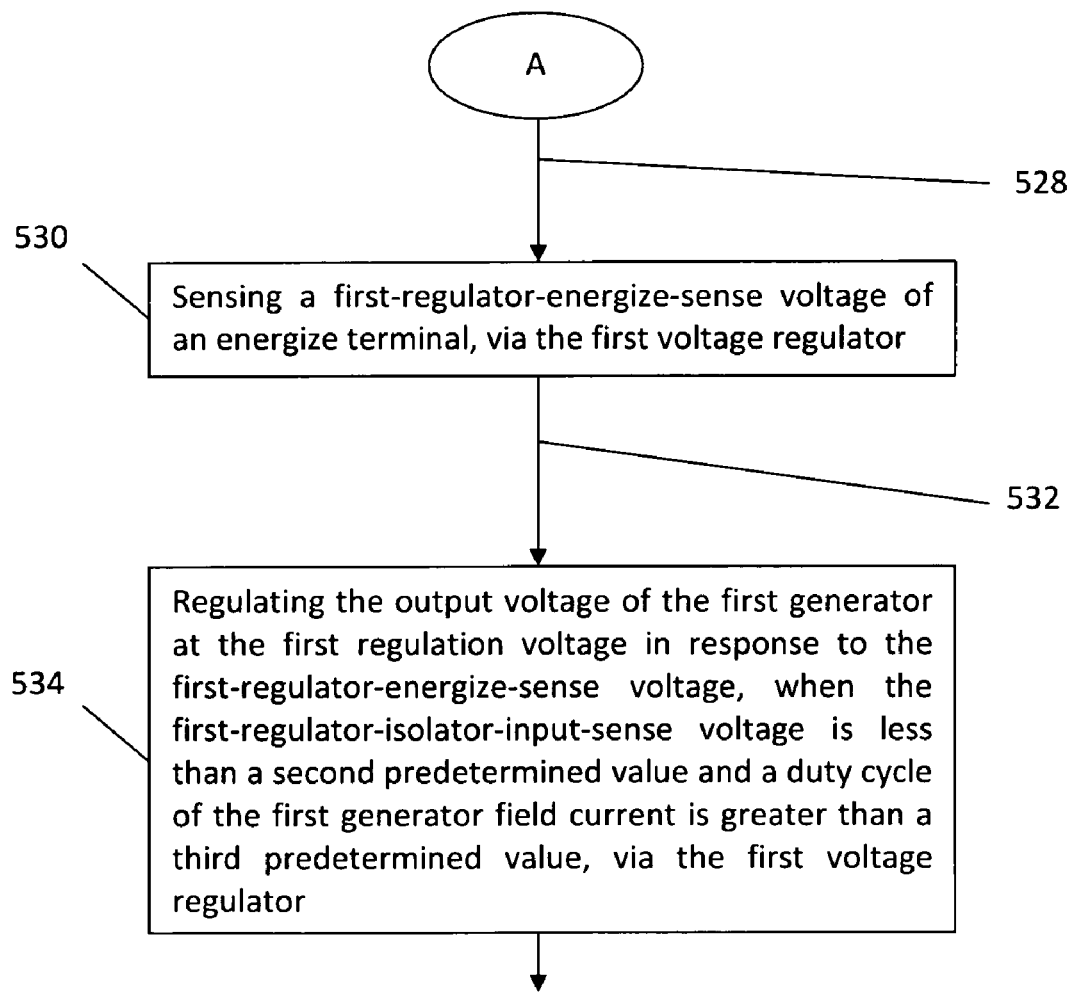
FIG. 5A is a flow diagram of one preferred method of operating a vehicle electrical system such as the one depicted in FIG. 1, which is similar to that of FIG. 5, further sensing the voltage at an energize terminal and regulating the output voltage of the first generator according to said voltage if the voltage at the input terminal of the means for isolating is less than a first threshold value and the duty cycle of the first generator's field current is greater than a second threshold.

FIG. 5A is a flow diagram that depicts two additional steps that maybe added to the method of operation, depicted in FIG. 5, so as to provide proper voltage regulation in light of system malfunction. Specifically, the first voltage regulator 114 further operates to sense a first-voltage-regulator-energize-sense voltage, such as the voltage $v_E$, via the first voltage regulator 114 at 530 and regulate the output voltage of the first generator 120 at the first regulation voltage $v_r$ in response to the sensed voltage $v_E$, when the $v_{IS}$ is less than a first threshold value and a duty cycle of the output field current of the first generator 120 is above a second threshold. These limits on the measured voltage $v_{IS}$ together with the limit on the duty cycle of the generator's field current indicate an inconsistency or malfunction with the operation of the vehicle electrical system. As such both first and second voltage regulators 114 and 104 provide passive and active control of the vehicle electrical system in the form of visual indicators and selection of the proper sensed voltage for purposes of voltage regulation.

Figure 6:
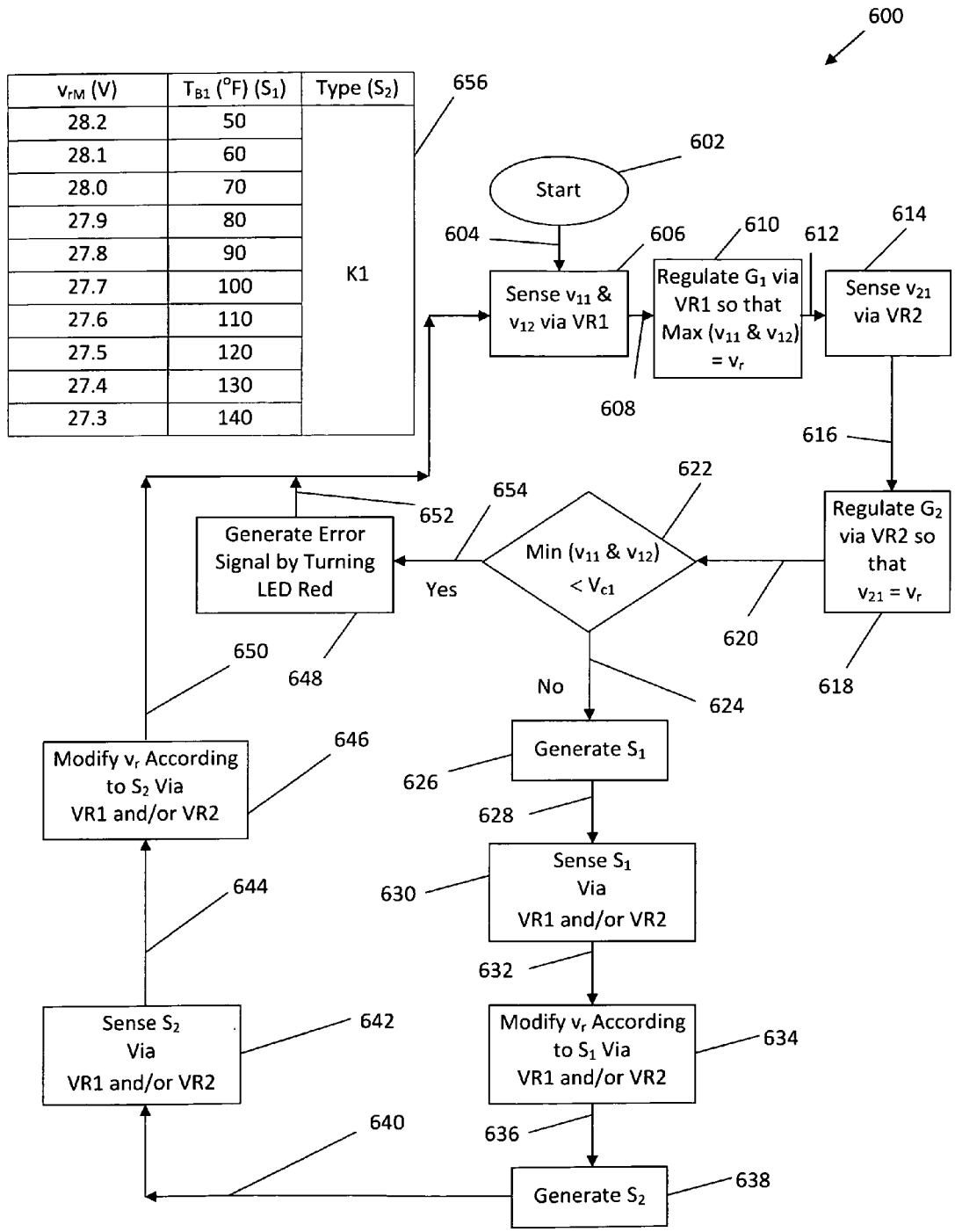
FIG. 6 is a flow diagram of one preferred method of operating a vehicle electrical system such as the one depicted in FIG. 1, substantially similar to that of methods depicted in FIGS. 4 and 4-A, further generating an error signal if the lowest of the two voltages at the two electrical subsystems is below a threshold, which maybe implemented on processors, included in the first and second voltage regulators.

FIG. 6 is a flow diagram 600 of one preferred method of operation of the vehicle electrical system 100 of FIG. 1, further illustrating the implementation of a programming code in a processor (not show) included in the first and second voltage regulators 114 and 104, respectively. The processor may be analog or digital such as a microprocessor. In one preferred embodiment, the microprocessor is a 68HC08 processor having internal flash memory available from Freescale of Scottsdale, Ariz. It is contemplated that the processor may be a combination of individual discrete or separate integrated circuits packaged in a single housing or it may be fabricated in a single integrated circuit.

Upon power up at 602, the processor, included in the first voltage regulator 114, measures two voltages, namely $v_{11}$ and $v_{12}$, at the outputs of the means for isolating 150 at 606. The processor in the first voltage regulator 114 regulates the output voltage of the first generator 120 so that the maximum value of $v_{11}$ and $v_{12}$ is substantially equal to the first regulation voltage $v_r$ at 610. The processor, included in the second voltage regulator 104, measures the voltage $v_{21}$ at the input to the means for sequencing, i.e., the diode 152 which, in this preferred embodiment, is the same point as the output terminal 154 of the second generator 106 at 614. The processor branches at 616 and regulates the output voltage of the second generator 106 so that the measured voltage $v_{21}$ is substantially equal to the first regulation voltage $v_r$ at 618. These steps, when implemented in a vehicle electrical system of FIG. 1, ensure that the first and second generators 120 and 106 provide electrical power sequentially, first from the first generator 120 and then from the second generator 106, to two electrical subsystems 132 and 136 that are electrically isolated via the means for isolating 150.

The additional steps, shown in FIG. 6, are performed so as to monitor and respond to additional parameters related to inconsistency in the value of $v_{11}$ and $v_{12}$, and potential modification of the regulation voltage as a function of temperature and type of the battery 128. Specifically, the processor compares the lowest value of the two voltages $v_{11}$ and $v_{12}$ with a predetermined value $v_{c1}$ at 622. If the lowest value is less than the predetermined value, then the processor branches at 654 and generates an error signal by turning on a red LED at 648.

If the lowest value is not less than the predetermined value, then the processor branches at 624 and senses the signal $S_1$ at 630, generated by the battery 128, indicative of the temperature of the battery 128, at 626. Although not shown in FIG. 1, the signal $S_1$ is available to both voltage regulators 104 and 114 and as such either or both regulators may sense the signal and communicate it with the other voltage regulator or the vehicle computer system. Either or both processors in the first and second voltage regulators 104 and 114 may modify the regulation voltage $v_r$ according to a look-up table, such as that shown at 656 or a functional relationship computed by the processor at 634. A signal $S_2$, indicative of the type of the battery 128, is generated at 638 and either or both voltage regulators 104 and 114 sense the signal $S_2$ at 642 and modify the regulation voltage $v_r$ at 646.

Figure 7:
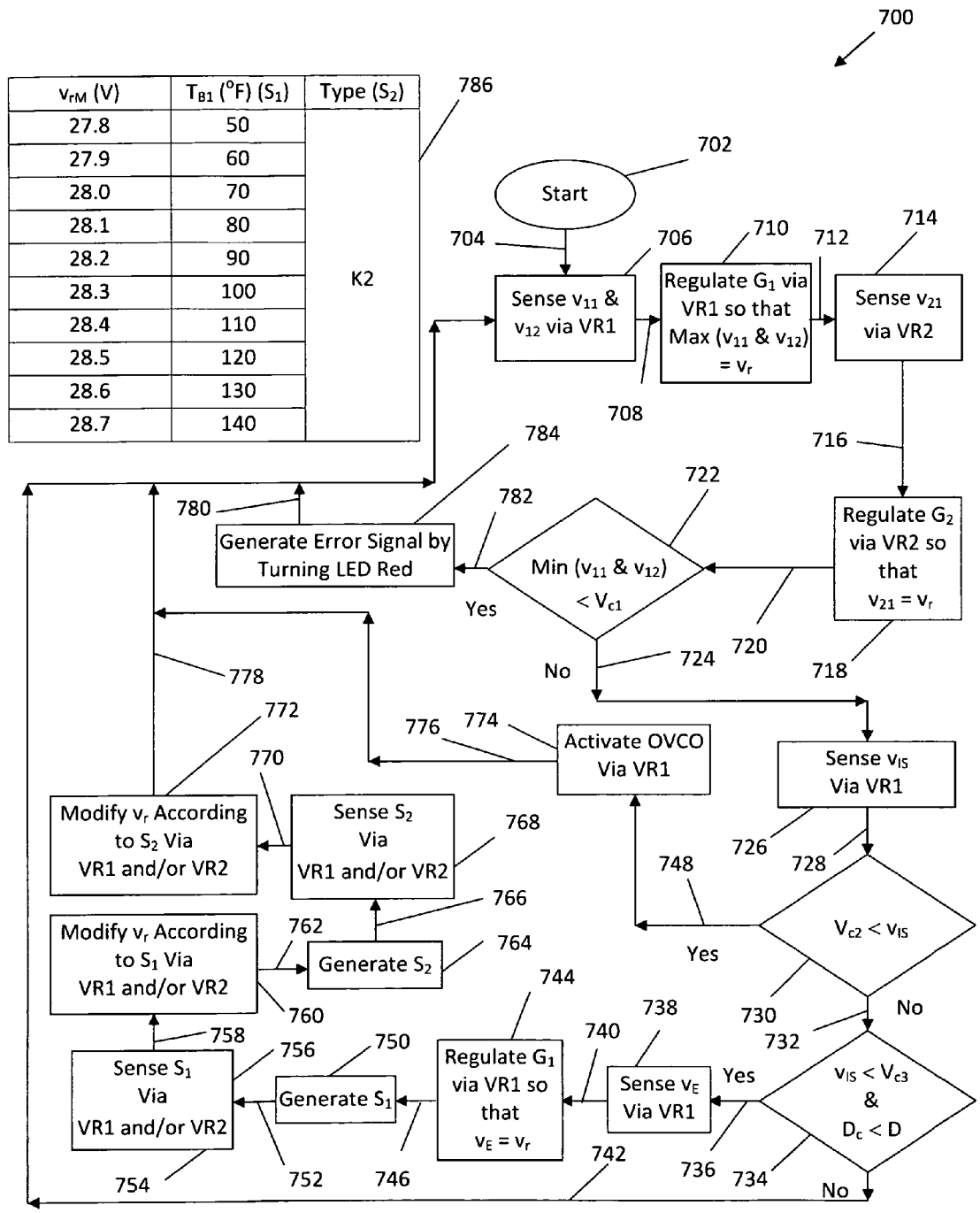
FIG. 7 is a flow diagram of one preferred method of operating a vehicle electrical system such as the one depicted in FIG. 1, substantially similar to that of methods depicted in FIGS. 4 thru 5-A, which maybe implemented on processors, included in the first and second voltage regulators.

FIG. 7 is a flow diagram 700 of one preferred method of operation of the vehicle electrical system 100 of FIG. 1. According to this preferred method, additional steps are taken to ensure that an over voltage cut out circuit is triggered upon detection of an over voltage condition and comparison of the sensed voltages and generator output power controller to ascertain which sensed voltage best represent the operating conditions.

Upon power up at 702, the processor, included in the first voltage regulator 114, measures two voltages, namely $v_{11}$ and $v_{12}$, at the outputs of the means for isolating 150 at 706. The processor in the first voltage regulator 114 regulates the output voltage of the first generator 120 so that the maximum value of $v_{11}$ and $v_{12}$ is substantially equal to the first regulation voltage $v_r$ at 710. The processor, included in the second voltage regulator 104, measures the voltage $v_{21}$ at the input to the means for sequencing, i.e., the diode 152 which, in this preferred embodiment, is the same point as the output terminal 154 of the second generator 106 at 714. The processor branches at 716 and regulates the output voltage of the second generator 106 so that the measured voltage $v_{21}$ is substantially equal to the first regulation voltage $v_r$ at 718. These steps, when implemented in a vehicle electrical system of FIG. 1, ensure that the first and second generators 120 and 106 provide electrical power sequentially, first from the first generator 120 and then from the second generator 106, to two electrical subsystems 132 and 136 that are electrically isolated via the means for isolating 150.

The additional steps, shown in FIG. 7, are performed so as to monitor and respond to additional parameters related to inconsistency in the value of $v_{11}$, $v_{12}$ and $v_{IS}$, and potential modification of the regulation voltage as a function of temperature and type of the battery 128. Specifically, the processor compares the lowest value of the two voltages $v_{11}$ and $v_{12}$ with a predetermined value $v_{c1}$ at 722. As in FIG. 6, if the lowest value is less than the predetermined value, then the processor branches at 782 and generates an error signal by turning on a red LED at 784.

If the lowest value is not less than the predetermined value, then the processor branches at 724 and senses the signal $v_{IS}$ at 726 and compares it with a threshold value $v_{c2}$ at 730. If $v_{IS}$ is greater than the threshold value $v_{c2}$ the processor branches at 748 and activates an over voltage cut out (OVCO) circuit at 774 and branches at 776 to continue the process. If $v_{IS}$ is not greater than the threshold value $v_{c2}$ the processor branches at 732 and compares $v_{IS}$ to determine if it is smaller than another threshold value $v_{c3}$ at if the duty cycle D of the field current is greater than a threshold duty cycle $D_c$. If the condition is not met, the electrical system is operating as expected and the processor branches at 742 to continue the process. If, however, the condition is met, the processor branches at 736 and senses the voltage $v_E$ of an energize terminal at 738. The first regulator 114 regulates the first generator 120 so that $v_E = v_r$ at 744. The remaining steps 750 thru 772 are similar to those discussed in relation with FIG. 6. The only notable difference is the variation of regulation voltage as a function of temperature and type of the battery 128 in this preferred embodiment as shown at 786 where the modified regulation voltage $v_{rM}$ increases as the battery temperature $T_{BI}$ increases when charging a battery of type K2.

The foregoing discloses a vehicle electrical system, including methods of operations, which comprises two generators coupled with one or more electrical subsystem, each of which may include at least one of a stored energy source and electrical load. The generators are regulated via their corresponding voltage regulators at a common regulation voltage. Sequential electrical power delivery from the generators can be achieved by utilizing a sequencing means, such a diode or a long electrical cable, and selection of proper point at which the sense voltage is to be measured. Where two or more electrical subsystems are present, electrical isolation can be attained by an isolating means, such as diodes or integrated circuits. The voltage regulators further operate to ensure that the electrical subsystems are not overcharged by sensing and responding to the highest voltage of the two or more electrical subsystems. Other systems parameters are monitored and utilized so as to facilitate proper control and operation of the electrical system when an inconsistency or a fault occurs.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system, comprising:
   (a) a first generator coupled with two or more electrical subsystems, each of said electrical subsystems comprising at least one of a stored energy source and electrical load, via a means for isolating;
   (b) a second generator coupled with one of the two or more electrical subsystems, via a means for sequencing operative to introduce a change in voltage between the second generator and the one of the two or more electrical subsystems;
   (c) a first voltage regulator, coupled with the first generator, operative to sense two or more first-regulator-electrical-subsystems-sense voltages of the two or more electrical subsystems and regulate an output voltage of the first generator at a first regulation voltage in response to the highest voltage of the two or more first-regulator-electrical-subsystems-sense voltages;
   (d) a second voltage regulator, coupled with the second generator, operative to sense a second-regulator-generator-output-sense voltage of an output terminal of the second generator and regulate an output voltage of the second generator at the first regulation voltage in response to the second-regulator-generator-output-sense voltage;
   wherein the vehicle electrical system operates to electrically isolate the two or more electrical subsystems, to protect against overcharging the two or more electrical subsystems, and to provide electrical power to the two or more electrical subsystems sequentially from the first and second generators.

2. The system of claim 1, wherein the means for isolating comprises two or more diodes.

3. The system of claim 1, wherein the means for sequencing comprises one of a diode, an integrated circuit, an electrical cable.

4. The system of claim 1, wherein the two or more electrical subsystems comprise at least one stored energy source and the system further comprises means to generate a first signal indicative of a temperature of the stored energy source and wherein at least one of the first and second voltage regulators, further operates to sense the first signal and modify the first regulation voltage according to the first signal.

5. The system of claim 4, wherein at least one of the first and second voltage regulators further operates to generate an error signal indicative of a fault condition, via a means for communicating, when the first signal is outside of a predetermined range.

6. The system of claim 5, wherein the means for communicating is one of a light emitting diode and vehicle computer system I/O port.

7. The system of claim 4, wherein the first voltage regulator further operates to sense a first-regulator-energize-sense voltage of an energize terminal and regulate the output voltage of the first generator at the first regulation voltage in response to the first-regulator-energize-sense voltage, when the first signal is outside of a predetermined range.

8. The system of claim 4, wherein the means to generate the first signal is one of a thermistor disposed in proximity of the stored energy source, an internal voltage regulator temperature sensor, and vehicle computer system I/O port.

9. The system of claim 4, wherein the modification of the first regulation voltage is achieved via a lookup table.

10. The system of claim 4, wherein the first regulation voltage is modified according to a default temperature when the first signal is outside of a predetermined range.

11. The system of claim 4, further comprising means to generate a second signal indicative of a type of the stored energy source and wherein at least one of the first and second voltage regulators further operates to sense the second signal and further modify the first regulation voltage according to the second signal.

12. The system of claim 11, wherein the means to generate the second signal is one of a switch and vehicle computer system I/O port.

13. The system of claim 1, wherein at least one of the first and second voltage regulators further operates to generate an error signal indicative of a fault condition, via a means for communicating, when the lowest voltage of the two or more first-regulator-electrical-subsystems-sense voltages is less than a predetermined value.

14. The system of claim 1, wherein the first voltage regulator further operates to sense a first-regulator-energize-sense voltage of an energize terminal and regulate the output voltage of the first generator at the first regulation voltage in response to the first-regulator-energize-sense voltage, when the lowest voltage of the two or more first-regulator-electrical-subsystems-sense voltages is less than a predetermined value.

15. The system of claim 1, wherein the first voltage regulator further operates to activate an over-voltage-cut-out circuit when the highest voltage of the two or more first-regulator-electrical-subsystems-sense voltages is greater than a predetermined value.

16. The system of claim 1, wherein the first voltage regulator further operates to sense a first-regulator-isolator-input-sense voltage of an input terminal of the means for isolating and activate an over-voltage-cut-out circuit when the first regulator-isolator-input-sense voltage is greater than a first predetermined value.

17. The system of claim 16, wherein at least one of the first and second voltage regulators further operates to generate an error signal indicative of a fault condition, via a means for communicating, when the first-regulator-isolator-input-sense voltage is greater than the lowest voltage of the two or more first-regulator-electrical-subsystems-sense voltages by a second predetermined value.

18. The system of claim 16, wherein the first voltage regulator further operates to sense a first-regulator-energize-sense voltage of an energize terminal and regulate the output voltage of the first generator at the first regulation voltage in response to the first-regulator-energize-sense voltage, when the first-regulator-isolator-input-sense voltage is greater than the lowest voltage of the two or more first-regulator-electrical-subsystems-sense voltages by a second predetermined value.

19. The system of claim 16, wherein at least one of the first and second voltage regulators further operates to generate an error signal indicative of a fault condition, via a means for communicating, when the first-regulator-isolator-input-sense voltage is less than a second predetermined value and a duty cycle of the first generator field current is greater than a third predetermined value.

20. The system of claim 16, wherein the first voltage regulator further operates to sense a first-regulator-energize-sense voltage of an energize terminal and regulate the output voltage of the first generator at the first regulation voltage in response to the first-regulator-energize-sense voltage, when the first-regulator-isolator-input-sense voltage is less than a second predetermined value and a duty cycle of the first generator field current is greater than a third predetermined value.

21. The system of claim 1, wherein the first voltage regulator further operates to sense a first-regulator-energize-sense voltage of an energize terminal and activate an over-voltage-cut-out circuit when the first-regulator-energize-sense voltage is greater than a predetermined value.

22. A vehicle electrical system, comprising:
(a) a first generator coupled with two or more electrical subsystems, each of said electrical subsystems comprising at least one of a stored energy source and electrical load, via a means for isolating;
(b) a second generator coupled with one of the two or more electrical subsystems, via a means for sequencing operative to introduce a change in voltage between the second generator and the one of the two or more electrical subsystems;
(c) a first voltage regulator, coupled with the first generator, operative to sense a first-regulator-electrical subsystems-sense voltage of one of the two or more electrical subsystems and regulate an output voltage of the first generator at a first regulation voltage in response to the first-regulator-electrical subsystems-sense voltage;
(d) a second voltage regulator, coupled with the second generator, operative to sense a second-regulator-generator-output-sense voltage of an output terminal of the second generator and regulate an output voltage of the second generator at the first regulation voltage in response to the second-regulator-generator-output-sense voltage;
wherein the vehicle electrical system operates to electrically isolate the two or more electrical subsystems and to provide electrical power to the two or more electrical subsystems sequentially from the first and second generators.

23. A method for electrically isolating, protecting against overcharging, and providing electrical power, sequentially from a first and second generators, to two or more electrical subsystems in a vehicle electrical system, wherein each of said electrical subsystems comprising at least one of a stored energy source and electrical load, said first generator coupled with the two or more electrical subsystems via a means for isolating, said second generator coupled with one of the two or more electrical subsystems, via a means for sequencing operative to introduce a change in voltage between the second generator and the one of the two or more electrical subsystems, said method comprising:
 (i) sensing two or more first-regulator-electrical-subsystems-sense voltages of the two or more electrical subsystems, via a first voltage regulator coupled with the first generator;
 (ii) regulating an output voltage of the first generator at a first regulation voltage in response to the highest voltage of the two or more first-regulator-electrical-subsystems-sense voltages, via the first voltage regulator;
 (iii) sensing a second-regulator-generator-output-sense voltage of an output terminal of the second generator, via a second voltage regulator coupled with the second generator; and
 (iv) regulating an output voltage of the second generator at the first regulation voltage in response to the second-regulator-generator-output-sense voltage, via the second voltage regulator.

24. The method of claim 23, wherein the two or more electrical subsystems comprise at least one stored energy source and the system further comprises means to generate a first signal indicative of a temperature of the stored energy source, said method further comprising:
 (v) sensing the first signal, via at least one of the first and second voltage regulators; and
 (vi) modifying the first regulation voltage according to the first signal, via at least one of the first and second voltage regulators.

25. The method of claim 24, further comprising:
 (vii) generating an error signal indicative of a fault condition, when the first signal is outside of a predetermined range, via a means for communicating.

26. The method of claim 24, further comprising:
 (vii) sensing a first-regulator-energize-sense voltage of an energize terminal, via the first voltage regulator; and
 (viii) regulating the output voltage of the first generator at the first regulation voltage in response to the first-regulator-energize-sense voltage, when the first signal is outside of a predetermined range, via the first voltage regulator.

27. The method of claim 24, wherein the system further comprises means to generate a second signal indicative of a type of the stored energy source, said method further comprising:
 (vii) sensing the second signal, via at least one of the first and second voltage regulators; and
 (viii) modifying the first regulation voltage according to the second signal, via at least one of the first and second voltage regulators.

28. The method of claim 23, further comprising:
 (v) generating an error signal indicative of a fault condition when the lowest voltage of the two or more first-regulator-electrical-subsystems-sense voltages is less than a predetermined value, via a means for communicating.

29. The method of claim 23, further comprising:
 (v) sensing a first-regulator-energize-sense voltage of an energize terminal, via the first voltage regulator;
 (vi) regulating the output voltage of the first generator at the first regulation voltage in response to the first-regulator-energize-sense voltage, when the lowest voltage of the two or more first-regulator-electrical-subsystems-sense voltages is less than a predetermined value, via the first voltage regulator.

30. The method of claim 23, further comprising:
 (v) activating an over-voltage-cut-out circuit when the highest voltage of the two or more first-regulator-electrical-subsystems-sense voltages is greater than a predetermined value, via the first voltage regulator.

31. The method of claim 23, further comprising:
 (v) sensing a first-regulator-isolator-input-sense voltage of an input terminal of the means for isolating, via the first voltage regulator; and
 (vi) activating an over-voltage-cut-out circuit when the first regulator-isolator-input-sense voltage is greater than a first predetermined value, via the first voltage regulator.

32. The method of claim 31, further comprising:
 (vii) generating an error signal indicative of a fault condition when the first-regulator-isolator-input-sense voltage is greater than the lowest voltage of the two or more first-regulator-electrical-subsystems-sense voltages by a second predetermined value, via a means for communicating.

33. The method of claim 31, further comprising:
 (vii) sensing a first-regulator-energize-sense voltage of an energize terminal, via the first voltage regulator; and
 (viii) regulating the output voltage of the first generator at the first regulation voltage in response to the first-regulator-energize-sense voltage, when the first-regulator-isolator-input-sense voltage is greater than the lowest voltage of the two or more first-regulator-electrical-subsystems-sense voltages by a second predetermined value, via the first voltage regulator.

34. The method of claim 31, further comprising:
 (vii) generating an error signal indicative of a fault condition when the first-regulator-isolator-input-sense voltage is less than a second predetermined value and a duty cycle of the first generator field current is greater than a third predetermined value, via a means for communicating.

35. The method of claim 23, further comprising:
 (vii) sensing a first-regulator-energize-sense voltage of an energize terminal, via the first voltage regulator; and
 (viii) regulating the output voltage of the first generator at the first regulation voltage in response to the first-regulator-energize-sense voltage, when the first-regulator-isolator-input-sense voltage is less than a second predetermined value and a duty cycle of the first generator field current is greater than a third predetermined value, via the first voltage regulator.

36. The method of claim 23, further comprising:
 (v) sensing a first-regulator-energize-sense voltage of an energize terminal, via the first voltage regulator; and
 (vi) activating an over-voltage-cut-out circuit when the first-regulator-energize-sense voltage is greater than a predetermined value, via the first voltage regulator.

37. A method for electrically isolating and providing electrical power, sequentially from a first and second generators, to two or more electrical subsystems in a vehicle electrical system, wherein each of said electrical subsystems comprising at least one of a stored energy source and electrical load, said first generator coupled with the two or more electrical subsystems via a means for isolating, said second generator coupled with one of the two or more electrical subsystems, via a means for sequencing operative to introduce a change in voltage between the second generator and the one of the two or more electrical subsystems, said method comprising:

(i) sensing a first-regulator-electrical subsystems-sense voltage of one of the two or more electrical subsystems, via a first voltage regulator coupled with the first generator;

(ii) regulating an output voltage of the first generator at a first regulation voltage in response to the first-regulator-electrical subsystems-sense voltage, via the first voltage regulator;

(iii) sensing a second-regulator-generator-output-sense voltage of an output terminal of the second generator, via a second voltage regulator coupled with the second generator; and (iv) regulating an output voltage of the second generator at the first regulation voltage in response to the second-regulator-generator-output-sense voltage, via the second voltage regulator.

* * * * *